US012776257B2

(12) United States Patent
Park et al.

(10) Patent No.: US 12,776,257 B2
(45) Date of Patent: Oct. 27, 2026

(54) GATE DRIVER AND DISPLAY DEVICE INCLUDING THE SAME

(71) Applicant: Samsung Display Co., LTD., Yongin-si (KR)

(72) Inventors: Junhyun Park, Yongin-si (KR); Bon-Yong Koo, Yongin-si (KR); Hyunjoon Kim, Yongin-si (KR); Youngwan Seo, Yongin-si (KR); Jihoon Yang, Yongin-si (KR); Minjae Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/170,281

(22) Filed: Apr. 4, 2025

(65) Prior Publication Data

US 2025/0342798 A1 Nov. 6, 2025

(30) Foreign Application Priority Data

May 3, 2024 (KR) ........................ 10-2024-0059042

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01); *G09G 2330/021* (2013.01)

(58) Field of Classification Search
CPC ............. G09G 3/32; G09G 2310/0267; G09G 2310/08; G09G 2330/021; G09G 3/3266; G09G 3/3677; G09G 2300/0426; G09G 2300/0852
See application file for complete search history.

(56) References Cited

U.S. PATENT DOCUMENTS

2015/0170592 A1* 6/2015 Bai ...................... G09G 3/3677 345/100
2017/0256223 A1* 9/2017 Du ........................ G09G 3/3677
2019/0287458 A1* 9/2019 Park ...................... G09G 3/3233
2021/0201753 A1* 7/2021 Feng ..................... G09G 3/2092
2023/0059832 A1* 2/2023 Wu ........................ G09G 3/3266
2023/0186825 A1* 6/2023 Seo ....................... G09G 3/3266

* cited by examiner

*Primary Examiner* — Hong Zhou
(74) *Attorney, Agent, or Firm* — CANTOR COLBURN LLP

(57) ABSTRACT

A gate driver includes a plurality of stages. Each of the stages includes a control circuit and first to (M−1)-th gate output circuits, and each of the stages receives first to M-th clock signals, respectively, where M is a positive integer greater than or equal to 3. The control circuit receives an input signal in response to one of the first to M-th clock signals, and controls a voltage of a control node and a voltage of an inverted control node based on the input signal. The first to (M−1)-th gate output circuits sequentially outputs clock signals different from the one of the first to M-th clock signals received by the control circuit among the first to M-th clock signals as first to (M−1)-th gate signals in response to the voltage of the control node and the voltage of the inverted control node.

21 Claims, 9 Drawing Sheets

GATE DRIVER AND DISPLAY DEVICE INCLUDING THE SAME

This application claims priority to Korean Patent Application No. 10-2024-0059042, filed on May 3, 2024, and all the benefits accruing therefrom under 35 U.S.C. § 119, the content of which in its entirety is herein incorporated by reference.

BACKGROUND

1. Field

Embodiments of the invention relates to a gate driver and a display device including the gate driver. More particularly, the invention relates to a gate driver and a display device including the gate driver for reducing a dead space and a power consumption.

2. Description of the Related Art

In general, a display device includes a display panel and a display panel driver. The display panel may include gate lines, data lines, emission lines, and pixels. The display panel driver may include a gate driver for providing a gate signal to the gate lines, a data driver for providing a data voltage to the data lines, an emission driver for providing an emission signal to the emission lines, and a driving controller for controlling the gate driver, the data driver, and the emission driver.

SUMMARY

In a display device where the gate driver is integrated into the display panel, a number of transistors and a number of signal lines of the gate driver may affect a dead space and a power consumption of the display device. For example, when the number of transistors and the number of signal lines of the gate driver are large, there is a problem that the dead space and the power consumption of the display device increase.

Embodiments of the invention provide a gate driver for reducing a dead space and a power consumption.

Embodiments of the invention provide a display device including the gate driver.

In an embodiment of a gate driver according to the invention, the gate driver includes a plurality of stages. In such an embodiment, Each of the stages includes a control circuit and first to (M−1)-th gate output circuits, and each of the stages receive first to M-th clock signals, respectively, where M is a positive integer greater than or equal to 3). In such an embodiment, the control circuit receives an input signal in response to one of the first to M-th clock signals, and controls a voltage of a control node and a voltage of an inverted control node based on the input signal. In such an embodiment, the first to (M−1)-th gate output circuits sequentially outputs clock signals different from the one of the first to M-th clock signals received by the control circuit among the first to M-th clock signals as first to (M−1)-th gate signals in response to the voltage of the control node and the voltage of the inverted control node.

In an embodiment, the one of the first to M-th clock signals may be the M-th clock signal, and the control circuit may include a first transistor including a gate electrode which receives the M-th clock signal, a first electrode which receives the input signal, and a second electrode connected to the control node, a second transistor including a gate electrode connected to the inverted control node, a first electrode which receives a high gate voltage, and a second electrode, and a third transistor including a gate electrode which receives a control clock signal, a first electrode connected to the control node, and a second electrode connected to the second electrode of the second transistor.

In an embodiment, the control clock signal may be one of the first to (M−1)-th clock signals.

In an embodiment, the control circuit may further include a fourth transistor including a gate electrode connected to the control node, a first electrode which receives the (M−1)-th clock signal, and a second electrode connected to the inverted control node.

In an embodiment, the control circuit may further include a fifth transistor including a gate electrode which receives the M-th clock signal, a first electrode which receives a low gate voltage, and a second electrode connected to the inverted control node.

In an embodiment, the control circuit may further include a fourth transistor including a gate electrode which receives the input signal, a first electrode which receives the (M−1)-th gate signal, and a second electrode connected to the inverted control node.

In an embodiment, the control circuit may further include a fifth transistor including a gate electrode which receives the (M−1)-th gate signal, a first electrode which receives a low gate voltage, and a second electrode connected to the inverted control node.

In an embodiment, the first gate output circuit may include a sixth transistor including a gate electrode connected to the inverted control node, a first electrode which receives the high gate voltage, and a second electrode connected to a first gate output node from which the first gate signal is output, a seventh transistor including a gate electrode connected to the control node, a first electrode which receives the first clock signal, and a second electrode connected to the first gate output node, a first capacitor including a first electrode which receives the high gate voltage and a second electrode connected to the inverted control node, and a second capacitor including a first electrode connected to the control node and a second electrode connected to the first gate output node. In such an embodiment, the second gate output circuit may include a ninth transistor including a gate electrode connected to the inverted control node, a first electrode which receives the high gate voltage, and a second electrode connected to a second gate output node from which the second gate signal is output, a tenth transistor including a gate electrode connected to the control node, a first electrode which receives the second clock signal, and a second electrode connected to the second gate output node, and a fourth capacitor including a first electrode connected to the control node and a second electrode connected to the second gate output node.

In an embodiment, the control node may include first to third control nodes. In such an embodiment, the first gate output circuit may further include an eighth transistor including a gate electrode which receives a low gate voltage, a first electrode connected to the first control node, and a second electrode connected to the second control node.

In an embodiment, the second gate output circuit may further include an eleventh transistor including a gate electrode which receives the low gate voltage, a first electrode connected to the first control node, and a second electrode connected to the third control node.

In an embodiment, the one of the first to M-th clock signals may be the M-th clock signal, and the control circuit may include a first transistor including a gate electrode which receives the M-th clock signal, a first electrode which receives the input signal, and a second electrode connected to the control node, a second transistor including a gate electrode connected to the control node, a first electrode which receives a high gate voltage, and a second electrode connected to the inverted control node, and a third transistor including a gate electrode connected to the control node, a first electrode which receives a low gate voltage, and a second electrode connected to the inverted control node.

In an embodiment, the first gate output circuit may include a fourth transistor including a gate electrode connected to the inverted control node, a first electrode which receives the high gate voltage, and a second electrode connected to a first gate output node from which a first gate signal is output, a fifth transistor including a gate electrode connected to the control node, a first electrode which receives the first clock signal, and a second electrode connected to the first gate output node, a first capacitor including a first electrode which receives the high gate voltage and a second electrode connected to the inverted control node, and a second capacitor including a first electrode connected to the control node and a second electrode connected to the first gate output node. In such an embodiment, the second gate output circuit may include a seventh transistor including a gate electrode connected to the inverted control node, a first electrode which receives the high gate voltage, and a second electrode connected to a second gate output node from which a second gate signal is output, an eighth transistor including a gate electrode connected to the control node, a first electrode which receives the second clock signal, and a second electrode connected to the second gate output node, and a fourth capacitor including a first electrode connected to the control node and a second electrode connected to the second gate output node.

In an embodiment, the control node may include first to third control nodes. In such an embodiment, the first gate output circuit may further include a sixth transistor including a gate electrode which receives the low gate voltage, a first electrode connected to the first control node, and a second electrode connected to the second control node.

In an embodiment, the second gate output circuit may further include a ninth transistor including a gate electrode which receives the low gate voltage, a first electrode connected to the second control node, and a second electrode connected to the third control node.

In an embodiment of a display device according to the invention, the display device includes a display panel including a plurality of pixels, and a gate driver which provides a gate signal to the pixels. In such an embodiment, the gate driver includes a plurality of stages. In such an embodiment, each of the stages includes a control circuit and first to (M−1)-th gate output circuits, where each of the stages receives first to M-th clock signals, respectively, where M is a positive integer greater than or equal to 3. In such an embodiment, the control circuit receives an input signal in response to one of the first to M-th clock signals, and controls a voltage of a control node and a voltage of an inverted control node based on the input signal. In such an embodiment, the first to (M−1)-th gate output circuits sequentially outputs clock signals different from the one of the first to M-th clock signals received by the control circuit among the first to M-th clock signals as first to (M−1)-th gate signals in response to the voltage of the control node and the voltage of the inverted control node.

In an embodiment, the one of the first to M-th clock signals may be the M-th clock signal, and the control circuit may include a first transistor including a gate electrode which receives the M-th clock signal, a first electrode which receives the input signal, and a second electrode connected to the control node, a second transistor including a gate electrode connected to the inverted control node, a first electrode which receives a high gate voltage, and a second electrode, and a third transistor including a gate electrode which receives a control clock signal, a first electrode connected to the control node, and a second electrode connected to the second electrode of the second transistor.

In an embodiment, the control clock signal may be one of the first to (M−1)-th clock signals.

In an embodiment, the control circuit may further include a fourth transistor including a gate electrode connected to the control node, a first electrode which receives the (M−1)-th clock signal, and a second electrode connected to the inverted control node.

In an embodiment, the control circuit may further include a fifth transistor including a gate electrode which receives the M-th clock signal, a first electrode which receives a low gate voltage, and a second electrode connected to the inverted control node.

In an embodiment, the control circuit may further include a fourth transistor including a gate electrode which receives the input signal, a first electrode which receives the (M−1)-th gate signal, and a second electrode connected to the inverted control node.

According to embodiments of the gate driver and the display device including the gate driver, since the gate output circuits share the control circuit, a number of transistors and a number of signal lines of each stage may be reduced, and a dead space and a power consumption of the display device may be reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
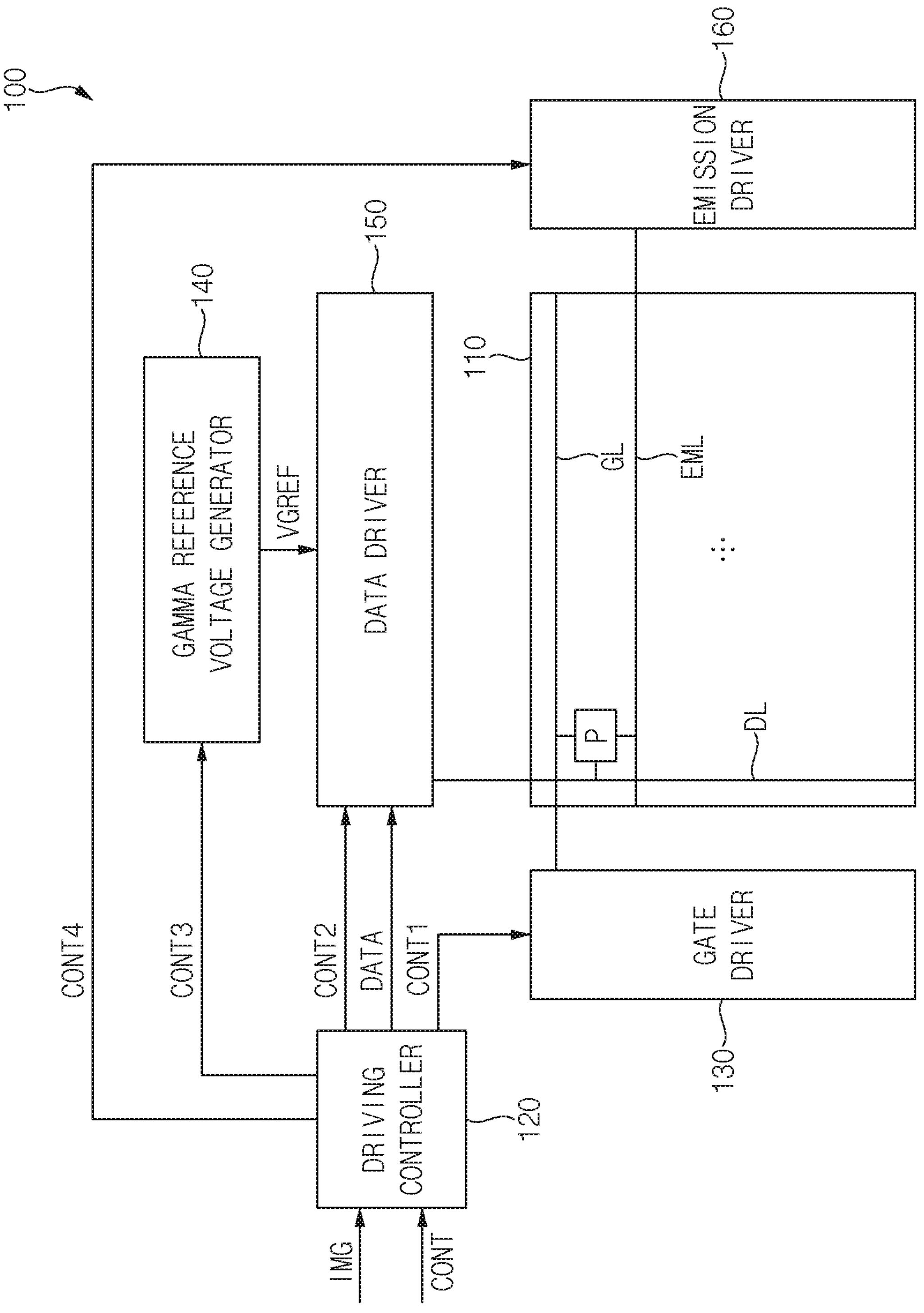
FIG. 1 is a block diagram showing a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein.

Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a" "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be described in more detail with reference to the accompanying drawings.

FIG. 1 is a block diagram showing a display device 100 according to embodiments of the invention.

Referring to FIG. 1, an embodiment of a display device 100 may include a display panel 110 and a display panel driver. The display panel driver may include a driving controller 120, a gate driver 130, a gamma reference voltage generator 140, a data driver 150, and an emission driver 160.

The display panel 110 may include a display region for displaying an image and a peripheral region disposed adjacent to the display region.

The display panel 110 may include gate lines GL, data lines DL, emission lines EML, and pixels P electrically connected to the gate lines GL, the data lines DL, and the emission lines E-L, respectively. The gate lines GL may extend in a first direction, the data lines DL may extend in a second direction crossing the first direction, and the emission lines EML may extend in the first direction.

The driving controller 120 may receive input image data IMG and an input control signal CONT from an external device. In an embodiment, for example, the input image data IMG may include red image data, green image data and blue image data. The input image data IMG may include white image data. In an embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, a fourth control signal CONT4, and a data signal DATA based on the input image data IMG and the input control signal CONT.

The driving controller 120 may generate the first control signal CONT1 for controlling an operation of the gate driver 130 based on the input control signal CONT, and output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and output the third control signal CONT3 to the gamma reference voltage generator 140.

The driving controller 120 may generate the fourth control signal CONT4 for controlling an operation of the emission driver 160 based on the input control signal CONT, and output the fourth control signal CONT4 to the emission driver 160.

The gate driver 130 may generate gate signals for driving the gate lines GL in response to the first control signal CONT1 received from the driving controller 120. The gate driver 130 may output the gate signals to the gate lines GL.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

In an embodiment, for example, the gamma reference voltage generator 140 may be disposed in the driving controller 120 or may be disposed in the data driver 150.

The data driver 150 may receive the second control signal CONT2 and the data signal DATA from the driving controller 120, and receive the gamma reference voltage VGREF from the gamma reference voltage generator 140. The data driver 150 may convert the data signal DATA into a data voltage having an analog type using the gamma reference voltage VGREF. The data driver 150 may output the data voltage to the data line DL.

The emission driver 160 may generate emission signals for driving the emission lines EML in response to the fourth control signal CONT4 received from the driving controller 120. The emission driver 160 may output the emission signals to the emission lines EML.

In an embodiment, as shown in FIG. 1, the gate driver 130 may be disposed on a first side of the display panel 110 and the emission driver 160 may be disposed on a second side of the display panel 110. Although shown, the invention is not limited thereto. In another embodiment, for example, both the gate driver 130 and the emission driver 160 may be disposed on the first side of the display panel 110. In another embodiment, for example, both the gate driver 130 and the emission driver 160 may be disposed on both opposing sides of the display panel 110. In another embodiment, for example, the gate driver 130 and the emission driver 160 may be formed integrally as a single chip.

Figure 2:
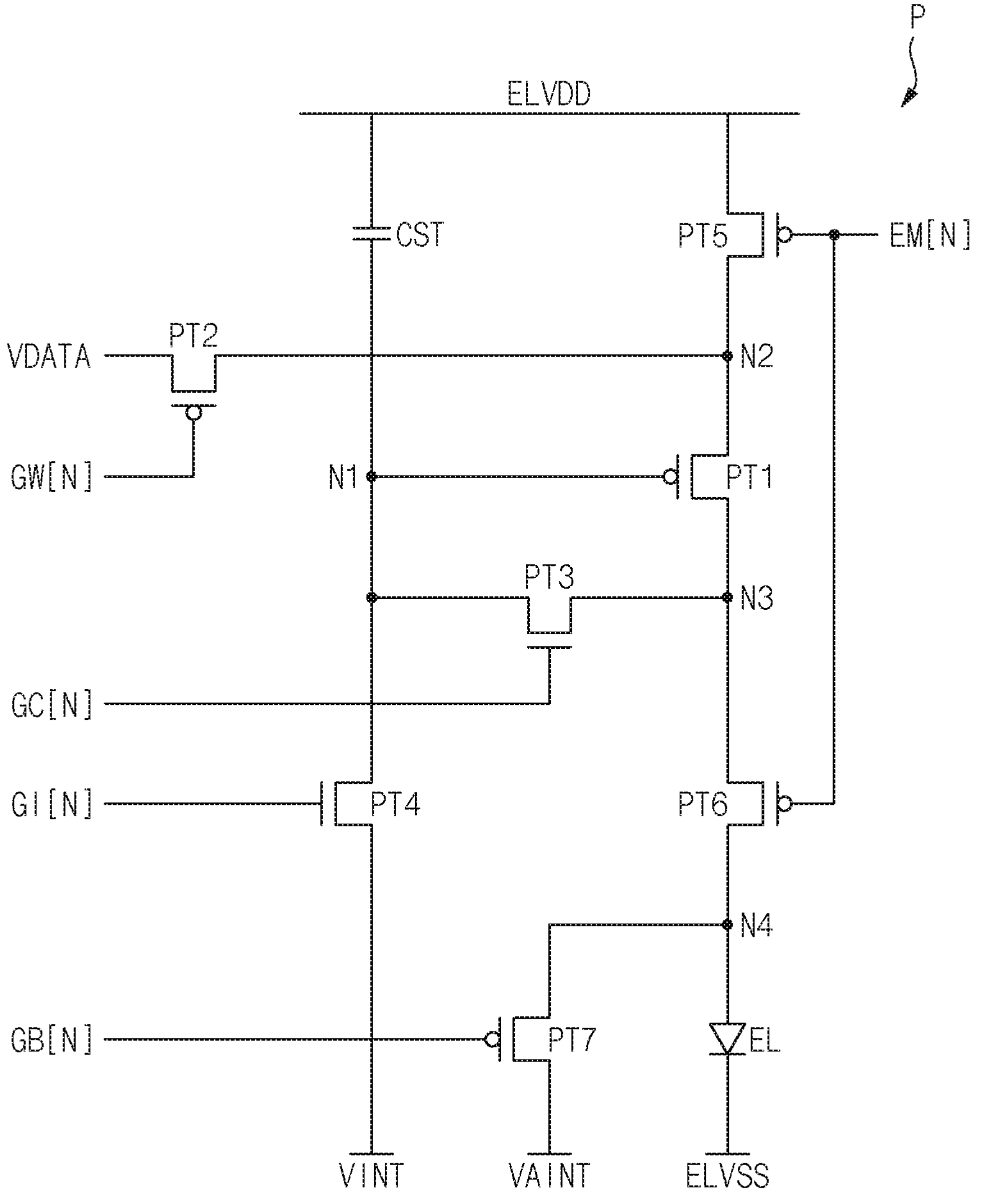
FIG. 2 is a circuit diagram showing an embodiment of a pixel of FIG. 1.

FIG. 2 is a circuit diagram showing an embodiment of a pixel P of FIG. 1.

Referring to FIGS. 1 and 2, an embodiment of the pixel P may include first to seventh pixel transistors PT1 to PT7, a storage capacitor CST, and a light emitting element EL.

The first pixel transistor PT1 may include a gate electrode connected to a first node N1, a first electrode connected to a second node N2, and a second electrode connected to a third node N3. The first pixel transistor PT1 may generate a driving current based on a difference between a voltage of the first node N1 and a voltage of the second node N2.

The second pixel transistor PT2 may include a gate electrode that receives a data write gate signal GW[N], a first electrode that receives a data voltage VDATA, and a second electrode connected to the second node N2. Here, N is a positive integer greater than or equal to 1. In such an embodiment, the pixel P may be a pixel in an N-th row. The second pixel transistor PT2 may provide the data voltage VDATA to the second node N2 in response to the data write gate signal GW[N].

The third pixel transistor PT3 may include a gate electrode that receives a compensation gate signal GC[N], a first electrode connected to the third node N3, and a second electrode connected to the first node N1. The third pixel transistor PT3 may diode-connect the first pixel transistor PT1 (or connect the first pixel transistor PT1 in a diode manner) in response to the compensation gate signal GC[N].

The fourth pixel transistor PT4 may include a gate electrode that receives an initialization gate signal GI[N], a first electrode that receives an initialization voltage VINT, and a second electrode connected to the first node N1. The fourth pixel transistor PT4 may provide the initialization voltage VINT to the first node N1 in response to the initialization gate signal GI[N].

The fifth pixel transistor PT5 may include a gate electrode that receives an emission signal EM[N], a first electrode that receives a first power voltage ELVDD, and a second electrode connected to the second node N2. The sixth pixel transistor PT6 may include a gate electrode that receives the emission signal EM[N], a first electrode connected to the third node N3, and a second electrode connected to a fourth node N4. The fifth pixel transistor PT5 and the sixth pixel transistor PT6 may control an emission time of the light emitting element EL in response to the emission signal EM.

The seventh pixel transistor PT7 may include a gate electrode that receives an anode initialization gate signal GB[N], a first electrode that receives an anode initialization voltage VAINT, and a second electrode connected to the fourth node N4. The seventh pixel transistor PT7 may provide the anode initialization voltage VAINT to the fourth node N4 in response to the anode initialization gate signal GB[N].

The storage capacitor CST may include a first electrode that receives the first power voltage ELVDD and a second electrode connected to the first node N1. The storage capacitor CST may store the data voltage VDATA.

The light emitting element EL may include an anode connected to the fourth node N4 and a cathode that receives a second power voltage ELVSS. The light emitting element EL may emit a light based on the driving current. Since an intensity of the driving current is determined based on a level of the data voltage VDATA, an intensity of the emission of the light emitting element EL may be determined based on the level of the data voltage VDATA.

In an embodiment, the first, second, and fifth to seventh pixel transistors PT1, PT2, PT5 to PT7 may be P-type transistors, and the third and fourth pixel transistors PT3, PT4 may be N-type transistors. In an embodiment, for example, the P-type transistor may be a P-type metal oxide semiconductor (PMOS) transistor. In an embodiment, for example, the N-type transistor may be an N-type metal oxide semiconductor (NMOS) transistor. However, the invention is not limited thereto. The first to seventh pixel transistors PT1 to PT7 may be the P-type transistors. Alternatively, the first to seventh pixel transistors PT1 to PT7 may be the N-type transistors. In addition, although an embodiment of the pixel P illustrated in FIG. 2 includes seven transistors PT1 to PT7 and one capacitor CST, the invention is not limited thereto. In embodiment, the pixel P may include at least two or more pixel switching elements or at least one or more capacitors.

Figure 3:
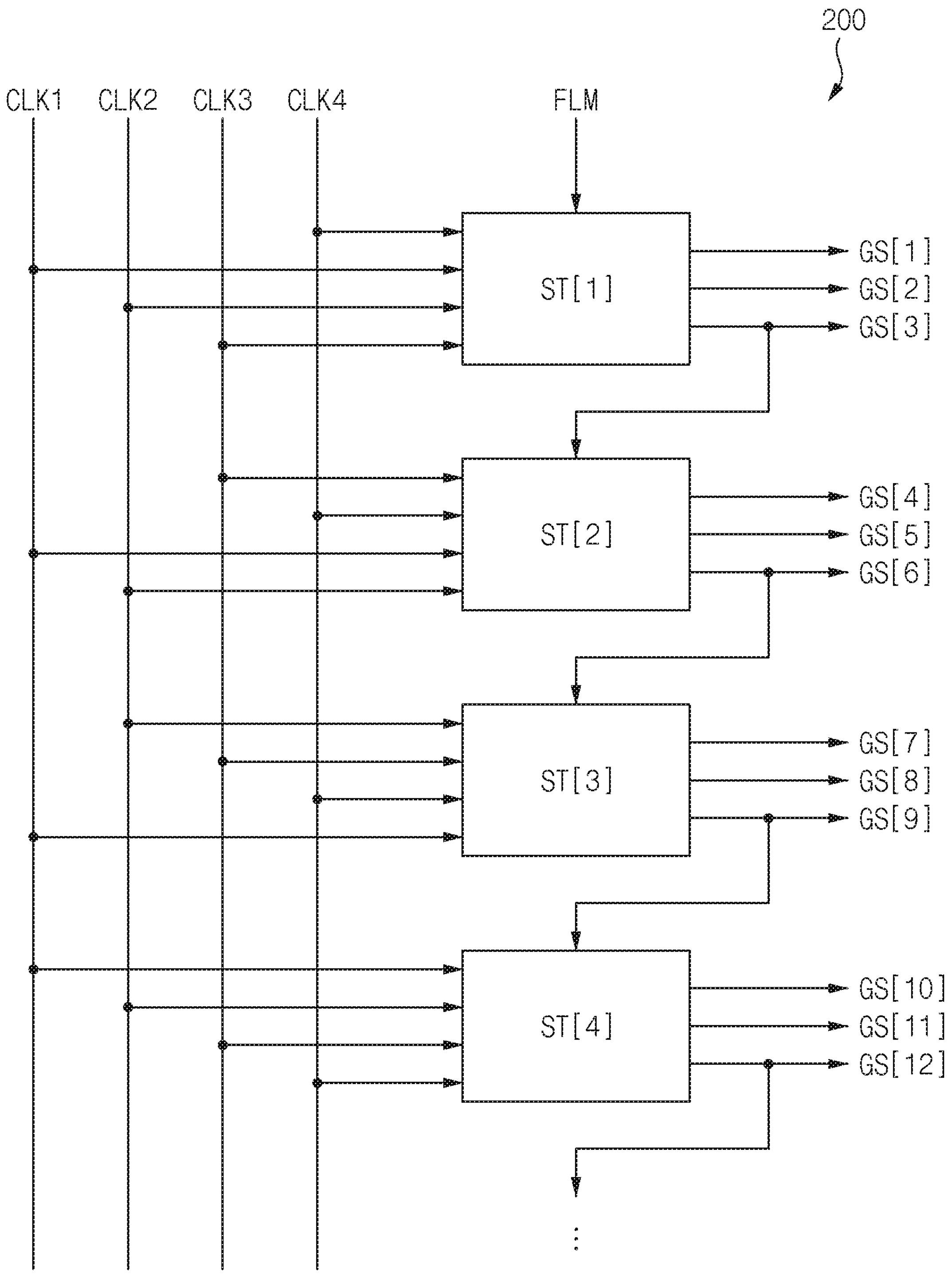
FIG. 3 is a block diagram showing a gate driver according to embodiments of the invention.
Figure 4:
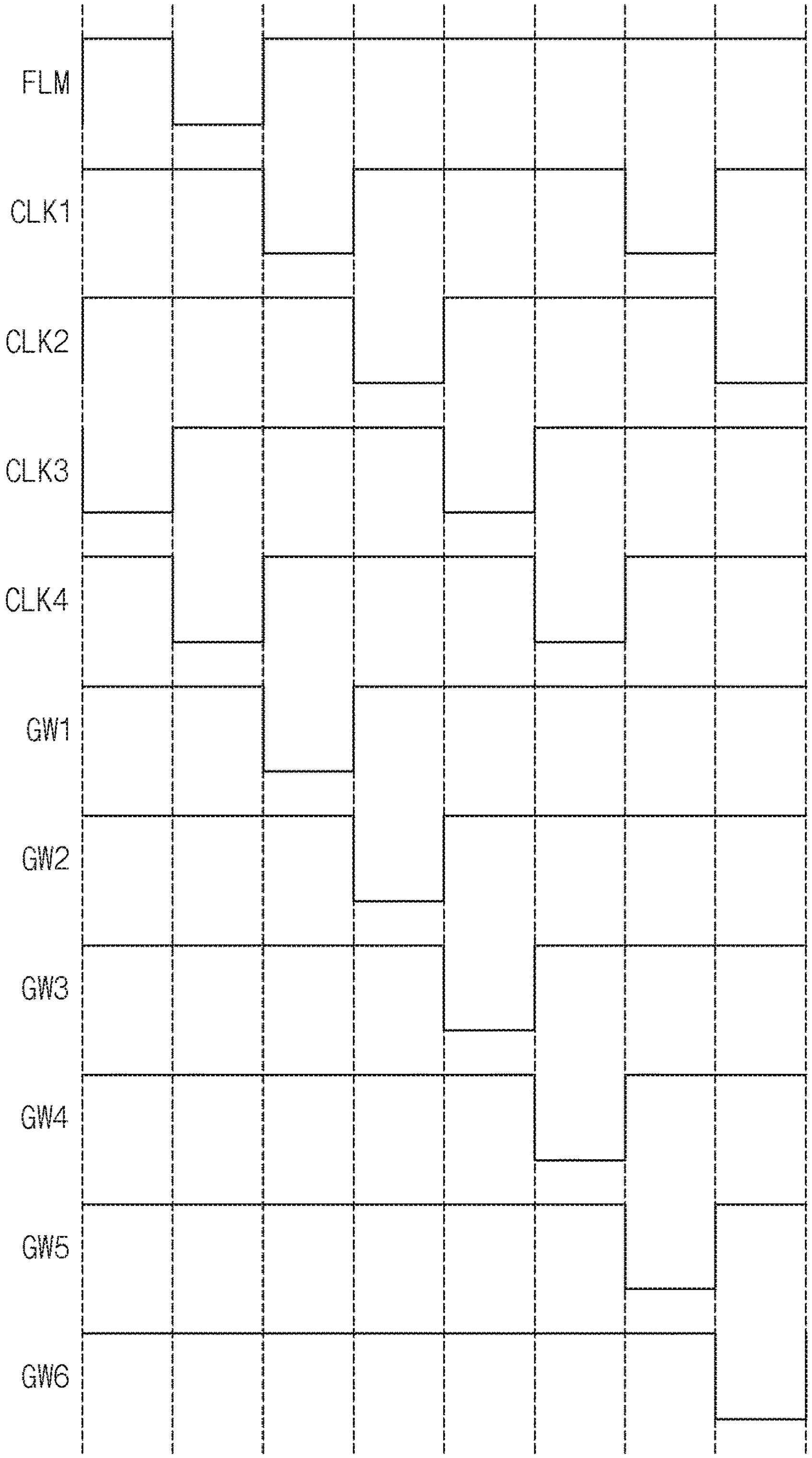
FIG. 4 is a timing diagram showing an embodiment of an operation of a gate driver 200 of FIG. 3.

FIG. 3 is a block diagram showing a gate driver 200 according to embodiments of the invention. FIG. 4 is a timing diagram showing an embodiment of an operation of a gate driver 200 of FIG. 3.

Referring to FIGS. 1 to 4, the gate driver 200 according to embodiments of the invention may include a plurality of stages ST[1], ST[2], ST[3], ST[4], . . . . Each of the stages ST[1], ST[2], ST[3], ST[4], . . . may receive a gate start signal FLM and clock signals CLK1 to CLK4. The clock signals CLK1 to CLK4 may have different phases from each other. The first stage ST[1] may receive the gate start signal FLM as an input signal, and the subsequent stages ST[2], ST[3], ST[4], . . . may receive previous gate signals GS[3], GS[6], GS[9], . . . as the input signals.

The stages ST[1], ST[2], ST[3], ST[4], . . . may sequentially generate gate signals GS[1], GS[2], GS[3], GS[4], GS[5], GS[6], GS[7], GS[8], GS[9], GS[10], GS[11], GS[12], . . . .

In an embodiment, for example, the first stage ST[1] may receive the gate start signal FLM in response to the fourth clock signal CLK1. The first stage ST[1] may generate the first clock signal CLK1 as a first gate signal GS[1] based on the gate start signal FLM. The first stage ST[1] may generate the second clock signal CLK2 as a second gate signal GS[2] based on the gate start signal FLM. The first stage ST[1] may generate the third clock signal CLK3 as a third gate signal GS[3] based on the gate start signal FLM.

In an embodiment, for example, the second stage ST[2] may receive the third gate signal GS[3] in response to the third clock signal CLK3. The second stage ST[2] may generate a fourth clock signal CLK4 as a fourth gate signal GS[4] based on the third gate signal GS[3]. The second stage ST[2] may generate the first clock signal CLK1 as a fifth gate signal GS[5] based on the third gate signal GS[3]. The second stage ST[2] may generate the second clock signal CLK2 as a sixth gate signal GS[6] based on the third gate signal GS[3].

In an embodiment, for example, a third stage ST[3] may receive the sixth gate signal GS[6] in response to the second clock signal CLK2. The third stage ST[3] may generate the third clock signal CLK3 as a seventh gate signal GS[7] based on the sixth gate signal GS[6]. The third stage ST[3] may generate the fourth clock signal CLK4 as an eighth gate signal GS[8] based on the sixth gate signal GS[6]. The third stage ST[3] may generate the first clock signal CLK1 as a ninth gate signal GS[9] based on the sixth gate signal GS[6].

In an embodiment, for example, a fourth stage ST[4] may receive the ninth gate signal GS[9] in response to the first clock signal CLK1. The fourth stage ST[4] may generate the second clock signal CLK2 as a tenth gate signal GS[10] based on the ninth gate signal GS[9]. The fourth stage ST[4] may generate the third clock signal CLK3 as an eleventh gate signal GS[11] based on the ninth gate signal GS[9]. The fourth stage ST[4] may generate the fourth clock signal CLK4 as a twelfth gate signal GS[12] based on the ninth gate signal GS[9].

Figure 5:
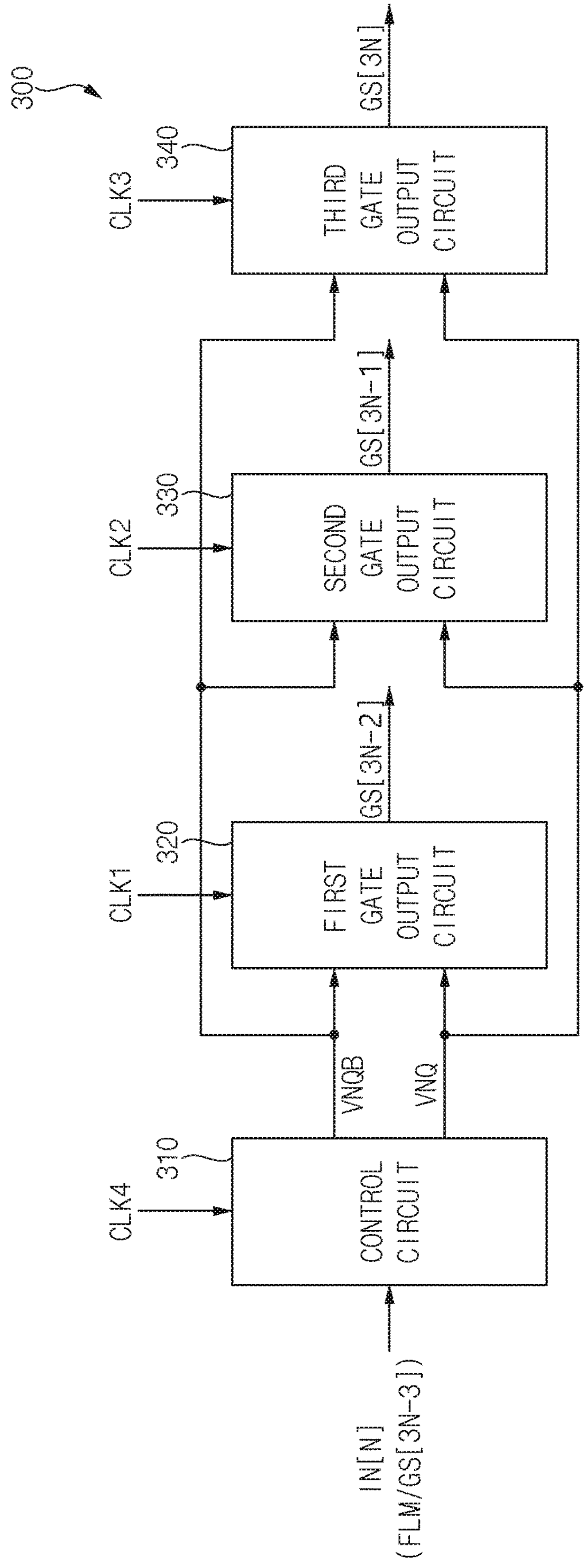
FIG. 5 is a block diagram showing a stage of a gate driver of FIG. 3.

FIG. 5 is a block diagram showing a stage 300 of a gate driver 200 of FIG. 3.

Referring to FIGS. 1 to 5, each stage 300 of the gate driver 200 according to embodiments of the invention may include a control circuit and first to (M−1)-th gate output circuits. Here, M is a positive integer greater than or equal to 3. Each stage 300 of the gate driver 200 may receive first to M-th clock signals. In an embodiment, for example, the control circuit may receive one of the first to M-th clock signals, and the first to (M−1)-th gate output circuits may respectively receive clock signals different from the clock signal received by the control circuit among the first to M-th clock signals. For convenience of description, embodiments where M is 4 will hereinafter be mainly described as an example, but not being limited thereto. In another embodiment, for example, M may be 3.

Each stage 300 of the gate driver 200 according to embodiments of the invention may include a control circuit 310 and gate output circuits 320, 330, 340. Here, the stage 300 may be an N-th stage. Here, N is a positive integer greater than or equal to 1.

The control circuit 310 may receive an input signal IN[N] in response to a fourth clock signal CLK4. The input signal IN[N] may be a gate start signal FLM or a previous gate signal GS[3N−3]. The control circuit 310 may control a voltage VNQ of a control node and a voltage VNQB of an inverted control node based on the input signal IN[N].

The gate output circuits 320, 330, 340 may receive clock signals CLK1, CLK2, CLK3 in response to the voltage VNQ of the control node and the voltage VNQB of the inverted control node. The gate output circuits 320, 330, 340 may sequentially generate and output the clock signals CLK1, CLK2, CLK3 as gate signals GS[3N−2], GS[3N−1], GS[3N]. Here, the clock signals CLK1, CLK2, CLK3 received by the gate output circuits 320, 330, 340 may be different from the clock signal CLK4 received by the control circuit 310.

In an embodiment, for example, the gate output circuits 320, 330, 340 may include a first gate output circuit 320, a second gate output circuit 330, and a third gate output circuit 340. The first gate output circuit 320 may generate a first clock signal CLK1 as a first gate signal GS[3N−2] in response to the voltage VNQ of the control node and the voltage VNQB of the inverted control node. The second gate output circuit 330 may generate a second clock signal CLK2 as a second gate signal GS[3N−1] in response to the voltage VNQ of the control node and the voltage VNQB of the inverted control node. The third gate output circuit 340 may generate a third clock signal CLK3 as a third gate signal GS[3N] in response to the voltage VNQ of the control node and the voltage VNQB of the inverted control node.

In such an embodiment, since the gate output circuits 320, 330, 340 share the control circuit 310, a number of transistors and a number of signal lines of each stage 300 may be reduced, and a dead space and a power consumption of a display device 100 may be reduced.

Figure 6:
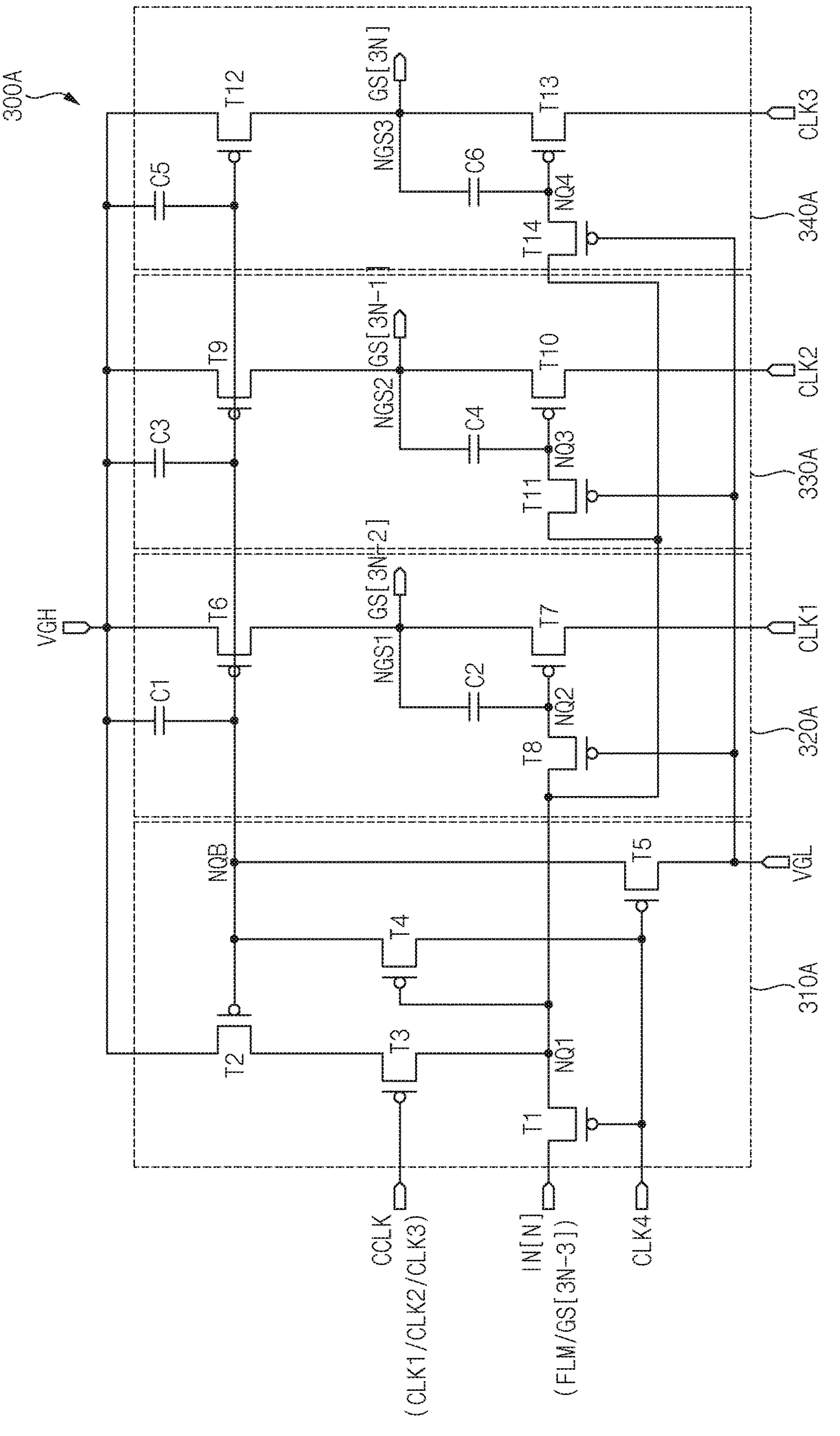
FIG. 6 is a circuit diagram showing an embodiment of a stage of a gate driver of FIG. 3.

FIG. 6 is a circuit diagram showing an embodiment 300A of a stage 300 of a gate driver 200 of FIG. 3.

Referring to FIGS. 1 to 6, an embodiment of each stage 300A may include a control circuit 310A and gate output circuits 320A, 330A, 340A. The control circuit 310A may receive a fourth clock signal CLK4. The gate output circuits 320A, 330A, 340A may receive clock signals CLK1, CLK2, CLK3 different from the fourth clock signal CLK4.

The control circuit 310A may receive an input signal IN[N] in response to the fourth clock signal CLK4, and may control a voltage VNQ of a control node NQ1, NQ2, NQ3, NQ4 and a voltage VNQB of an inverted control node NQB based on the input signal IN[N]. The input signal IN[N] may be a gate start signal FLM or a previous gate signal GS[3N−3].

The control circuit 310A may include a first transistor T1, a second transistor T2, and a third transistor T3. The control circuit 310A may further include a fourth transistor T4. The control circuit 310A may further include a fifth transistor T5.

The first transistor T1 may include a gate electrode that receives the fourth clock signal CLK4, a first electrode that receives the input signal IN[N], and a second electrode connected to the control nodes NQ1, NQ2, NQ3, NQ4.

The second transistor T2 may include a gate electrode connected to the inverted control node NQB, a first electrode that receives a high gate voltage VGH, and a second electrode.

The third transistor T3 may include a gate electrode that receives a control clock signal CCLK, a first electrode connected to the control nodes NQ1, NQ2, NQ3, NQ4, and a second electrode connected to the second electrode of the second transistor T2. In an embodiment, the control clock signal CCLK may be different from the fourth clock signal CLK4 and may be one of the clock signals CLK1, CLK2, CLK3 received by the gate output circuits 320A, 330A, 340A.

The fourth transistor T4 may include a gate electrode connected to the control nodes NQ1, NQ2, NQ3, NQ4, a first electrode that receives the fourth clock signal CLK4, and a second electrode connected to the inverted control node NQB.

The fifth transistor T5 may include a gate electrode that receives the fourth clock signal CLK4, a first electrode that receives a low gate voltage VGL, and a second electrode connected to the inverted control node NQB.

The gate output circuits 320A, 330A, 340A may receive the clock signals CLK1, CLK2, CLK3 in response to the voltage VNQ of the control nodes NQ1, NQ2, NQ3, NQ4 and the voltage VNQB of the inverted control node NQB. The gate output circuits 320A, 330A, 340A may sequentially generate the clock signals CLK1, CLK2, CLK3 as gate signals GS[N], GS[N+1], GS[N+2]. In an embodiment, for example, the gate output circuits 320A, 330A, 340A may include a first gate output circuit 320A, a second gate output circuit 330A, and a third gate output circuit 340A. In an embodiment, for example, the control nodes NQ1, NQ2, NQ3, NQ4 may include a first control node NQ1, a second control node NQ2, a third control node NQ3, and a fourth control node NQ4.

The first gate output circuit 320A may include a sixth transistor T6, a seventh transistor T7, a first capacitor C1, and a second capacitor C2. The first gate output circuit 320A may further include an eighth transistor T8.

The sixth transistor T6 may include a gate electrode connected to the inverted control node NQB, a first electrode that receives the high gate voltage VGH, and a second electrode connected to the first gate output node NGS1. A first gate signal GS[3N−2] may be output from the first gate output node NGS1.

The seventh transistor T7 may include a gate electrode connected to the second control node NQ2, a first electrode that receives a first clock signal CLK1, and a second electrode connected to the first gate output node NGS1.

The first capacitor C1 may include a first electrode that receives the high gate voltage VGH and a second electrode connected to the inverted control node NQB.

The second capacitor C2 may include a first electrode connected to the second control node NQ2 and a second electrode connected to the first gate output node NGS1.

The eighth transistor T8 may include a gate electrode that receives the low gate voltage VGL, a first electrode connected to the first control node NQ1, and a second electrode connected to the second control node NQ2. Since the eighth transistor T8 is turned on in response to the low gate voltage VGL, the eighth transistor T8 may be an always-on transistor (AOT).

The second gate output circuit 330A may include a ninth transistor T9, a tenth transistor T10, and a fourth capacitor C4. The second gate output circuit 330A may further include a third capacitor C3. The second gate output circuit 330A may further include an eleventh transistor T11.

The ninth transistor T9 may include a gate electrode connected to the inverted control node NQB, a first electrode that receives the high gate voltage VGH, and a second electrode connected to a second gate output node NGS2. A second gate signal GS[3N−1] may be output from the second gate output node NGS2.

The tenth transistor T10 may include agate electrode connected to the third control node NQ3, a first electrode that receives a second clock signal CLK2, and a second electrode connected to the second gate output node NGS2.

The third capacitor C3 may include a first electrode that receives the high gate voltage VGH and a second electrode connected to the inverted control node NQB.

The fourth capacitor C4 may include a first electrode connected to the third control node NQ3 and a second electrode connected to the second gate output node NGS2.

The eleventh transistor T11 may include a gate electrode that receives the low gate voltage VGL, a first electrode connected to the first control node NQ1, and a second electrode connected to the third control node NQ3. Since the eleventh transistor T11 is turned on in response to the low gate voltage VGL, the eleventh transistor T11 may be the always-on transistor.

The third gate output circuit 340A may include a twelfth transistor T12, a thirteenth transistor T13, and a sixth capacitor C6. The third gate output circuit 340A may further include a fifth capacitor C5. The third gate output circuit 340A may further include a fourteenth transistor T14.

The twelfth transistor T12 may include a gate electrode connected to the inverted control node NQB, a first electrode that receives the high gate voltage VGH, and a second electrode connected to a third gate output node NGS3. A third gate signal GS[3N] may be output from the third gate output node NGS3.

The thirteenth transistor T13 may include a gate electrode connected to the fourth control node NQ4, a first electrode that receives a third clock signal CLK3, and a second electrode connected to the third gate output node NGS3.

The fifth capacitor C5 may include a first electrode that receives the high gate voltage VGH and a second electrode connected to the inverted control node NQB.

The sixth capacitor C6 may include a first electrode connected to the fourth control node NQ4 and a second electrode connected to the third gate output node NGS3.

The fourteenth transistor T14 may include a gate electrode that receives the low gate voltage VGL, a first electrode connected to the first control node NQ1, and a second electrode connected to the fourth control node NQ4. Since the fourteenth transistor T14 is turned on in response to the low gate voltage VGL, the fourteenth transistor T14 may be the always-on transistor.

In an embodiment, the first to fourteenth transistors T1 to T14 may be P-type transistors. In an embodiment, for example, the P-type transistor may be a PMOS transistor.

Figure 7:
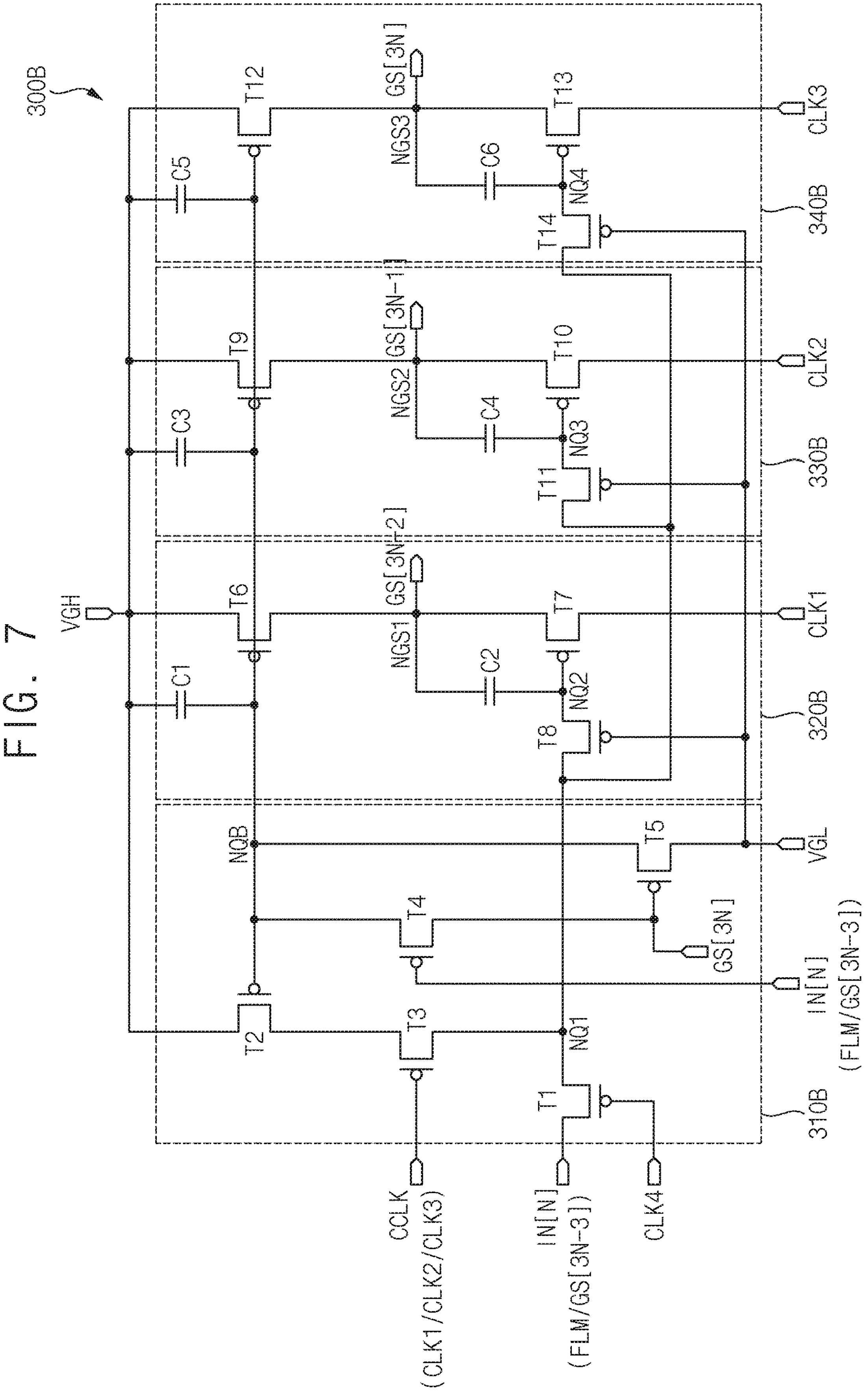
FIG. 7 is a circuit diagram showing another embodiment of a stage of a gate driver of FIG. 3.

FIG. 7 is a circuit diagram showing another embodiment 300B of a stage 300 of a gate driver 200 of FIG. 3.

Referring to FIGS. 1 to 7, the stage 300B of FIG. 7 is substantially to the same as the stage 300A of FIG. 6, except that a gate electrode of a fourth transistor T4 receives an input signal IN[N], a first electrode of the fourth transistor T4 receives a third gate signal GS[3N], and a gate electrode of a fifth transistor T5 receives the third gate signal GS[3N]. Therefore, the same reference numerals are used for the same or similar components, and any repetitive detailed description thereof will be omitted.

In an embodiment of the stage 300B, as shown in FIG. 7, the fourth transistor T4 may include the gate electrode that receives the input signal IN[N], the first electrode that receives the third gate signal GS[3N], and a second electrode connected to an inverted control node NQB.

The fifth transistor T5 may include the gate electrode that receives the third gate signal GS[3N], a first electrode that receives a low gate voltage VGL, and a second electrode connected to the inverted control node NQB.

Figure 8:
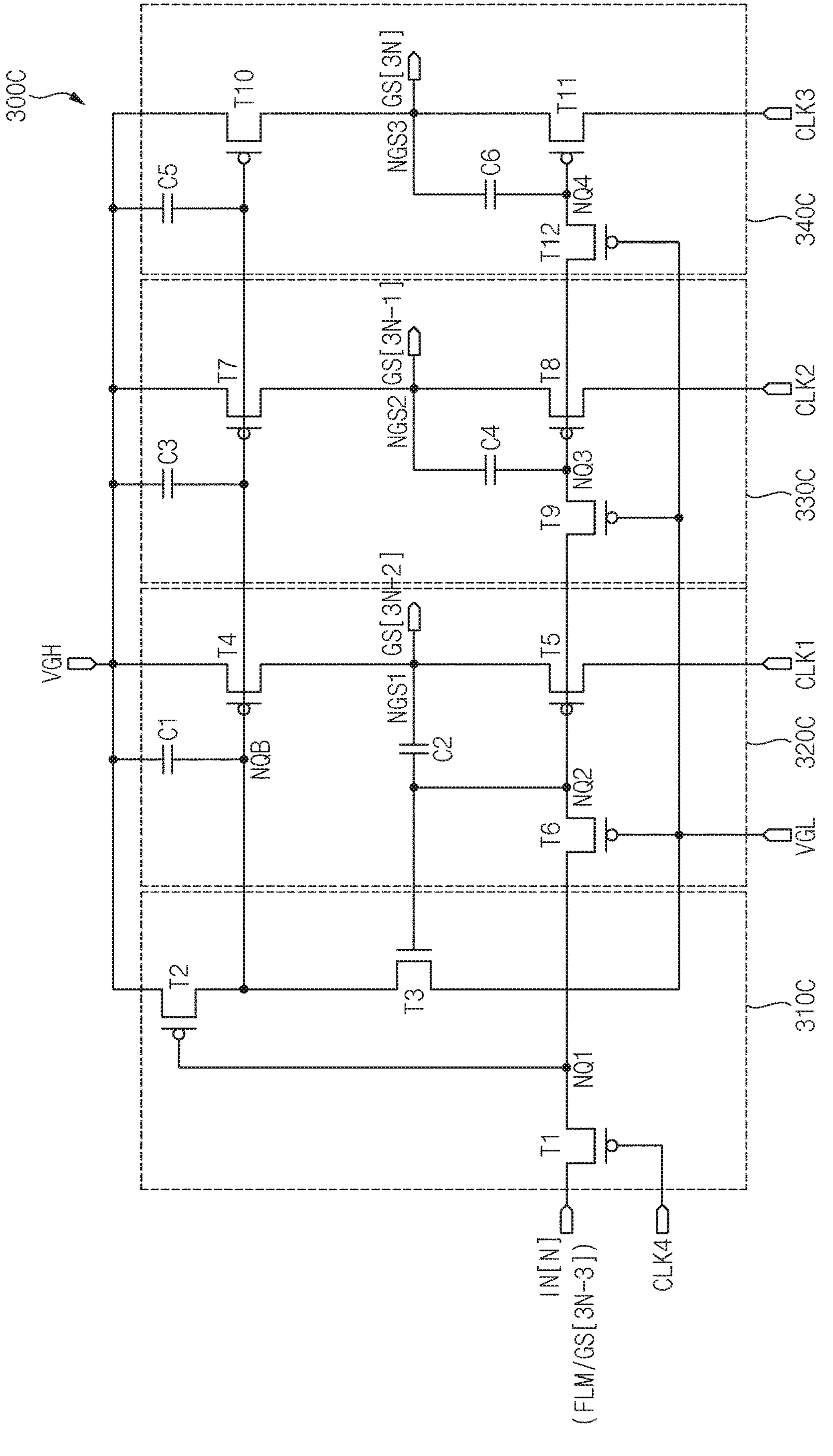
FIG. 8 is a circuit diagram showing another embodiment of a stage of a gate driver of FIG. 3.

FIG. 8 is a circuit diagram showing another embodiment 300C of a stage 300 of a gate driver 200 of FIG. 3.

Referring to FIGS. 1 to 5 and FIG. 8, an embodiment of each stage 300C may include a control circuit 310C and gate output circuits 320C, 330C, 340C. The control circuit 310C may receive a fourth clock signal CLK4. The gate output circuits 320C, 330C, 340C may receive clock signals CLK1, CLK2, CLK3 different from the fourth clock signal CLK4.

The control circuit 310C may receive an input signal IN[N] in response to the fourth clock signal CLK4, and may control a voltage VNQ of a control node NQ1, NQ2, NQ3, NQ4 and a voltage VNQB of an inverted control node NQB based on the input signal IN[N]. The input signal IN[N] may be a gate start signal FLM or a previous gate signal GS[3N−3].

The control circuit 310C may include a first transistor T1, a second transistor T2, and a third transistor T3.

The first transistor T1 may include a gate electrode that receives the fourth clock signal CLK4, a first electrode that receives the input signal IN[N], and a second electrode connected to the control nodes NQ1, NQ2, NQ3, NQ4.

The second transistor T2 may include a gate electrode connected to the control nodes NQ1, NQ2, NQ3, NQ4, a first electrode that receives a high gate voltage VGH, and a second electrode.

The third transistor T3 may include agate electrode connected to the control nodes NQ1, NQ2, NQ3, NQ4, a first electrode that receives a low gate voltage VGL, and a second electrode connected to the second electrode of the second transistor T2.

The gate output circuits 320C, 330C, 340C may receive clock signals CLK1, CLK2, CLK3 in response to the voltage VNQ of the control nodes NQ1, NQ2, NQ3, NQ4 and the voltage VNQB of the inverted control node NQB. The gate output circuits 320A, 330A, 340A may sequentially generate the clock signals CLK1, CLK2, CLK3 as gate signals GS[N], GS[N+1], GS[N+2]. In an embodiment, for example, the gate output circuits 320C, 330C, 340C may include a first gate output circuit 320C, a second gate output circuit 330C, and a third gate output circuit 340C. In an embodiment, for example, the control nodes NQ1, NQ2, NQ3, NQ4 may include a first control node NQ1, a second control node NQ2, a third control node NQ3, and a fourth control node NQ4.

The first gate output circuit 320C may include a fourth transistor T4, a fifth transistor T5, a first capacitor C1, and a second capacitor C2. The first gate output circuit 320C may further include a sixth transistor T6.

The fourth transistor T4 may include a gate electrode connected to the inverted control node NQB, a first electrode that receives the high gate voltage VGH, and a second electrode connected to the first gate output node NGS1. A first gate signal GS[3N−2] may be output from the first gate output node NGS1.

The fifth transistor T5 may include a gate electrode connected to the second control node NQ2, a first electrode that receives a first clock signal CLK1, and a second electrode connected to the first gate output node NGS1.

The first capacitor C1 may include a first electrode that receives the high gate voltage VGH and a second electrode connected to the inverted control node NQB.

The second capacitor C2 may include a first electrode connected to the second control node NQ2 and a second electrode connected to the first gate output node NGS1.

The sixth transistor T6 may include a gate electrode that receives the low gate voltage VGL, a first electrode connected to the first control node NQ1, and a second electrode connected to the second control node NQ2. Since the sixth transistor T6 is turned on in response to the low gate voltage VGL, the eighth transistor T8 may be an always-on transistor.

The second gate output circuit 330C may include a seventh transistor T7, an eighth transistor T8, and a fourth capacitor C4. The second gate output circuit 330C may further include a third capacitor C3. The second gate output circuit 330C may further include a ninth transistor T9.

The seventh transistor T7 may include a gate electrode connected to the inverted control node NQB, a first electrode that receives the high gate voltage VGH, and a second electrode connected to the second gate output node NGS2. A second gate signal GS[3N−1] may be output from the second gate output node NGS2.

The eighth transistor T8 may include agate electrode connected to the third control node NQ3, a first electrode that receives a second clock signal CLK2, and a second electrode connected to the second gate output node NGS2.

The third capacitor C3 may include a first electrode that receives the high gate voltage VGH and a second electrode connected to the inverted control node NQB.

The fourth capacitor C4 may include a first electrode connected to the third control node NQ3 and a second electrode connected to the second gate output node NGS2.

The ninth transistor T9 may include a gate electrode that receives the low gate voltage VGL, a first electrode connected to the second control node NQ2, and a second electrode connected to the third control node NQ3. Since the ninth transistor T9 is turned on in response to the low gate voltage VGL, the ninth transistor T9 may be the always-on transistor.

The third gate output circuit 340C may include a tenth transistor T10, an eleventh transistor T11, and a sixth capacitor C6. The third gate output circuit 340C may further include a fifth capacitor C5. The third gate output circuit 340C may further include a twelfth transistor T12.

The tenth transistor T10 may include a gate electrode connected to the inverted control node NQB, a first electrode that receives the high gate voltage VGH, and a second electrode connected to the third gate output node NGS3. Athird gate signal GS[3N] may be output from the third gate output node NGS3.

The eleventh transistor T11 may include a gate electrode connected to the fourth control node NQ4, a first electrode that receives a third clock signal CLK3, and a second electrode connected to the third gate output node NGS3.

The fifth capacitor C5 may include a first electrode that receives the high gate voltage VGH and a second electrode connected to the inverted control node NQB.

The sixth capacitor C6 may include a first electrode connected to the fourth control node NQ4 and a second electrode connected to the third gate output node NGS3.

The twelfth transistor T12 may include a gate electrode that receives the low gate voltage VGL, a first electrode connected to the third control node NQ3, and a second electrode connected to the fourth control node NQ4. Since the twelfth transistor T12 is turned on in response to the low gate voltage VGL, the twelfth transistor T12 may be the always-on transistor.

In an embodiment, the first, second, and fourth to twelfth transistors T1, T2, T4 to T12 may be P-type transistors, and the third transistor T3 may be an N-type transistor. In an embodiment, for example, the P-type transistor may be a PMOS transistor. In an embodiment, for example, the N-type transistor may be an NMOS transistor.

Figure 9:
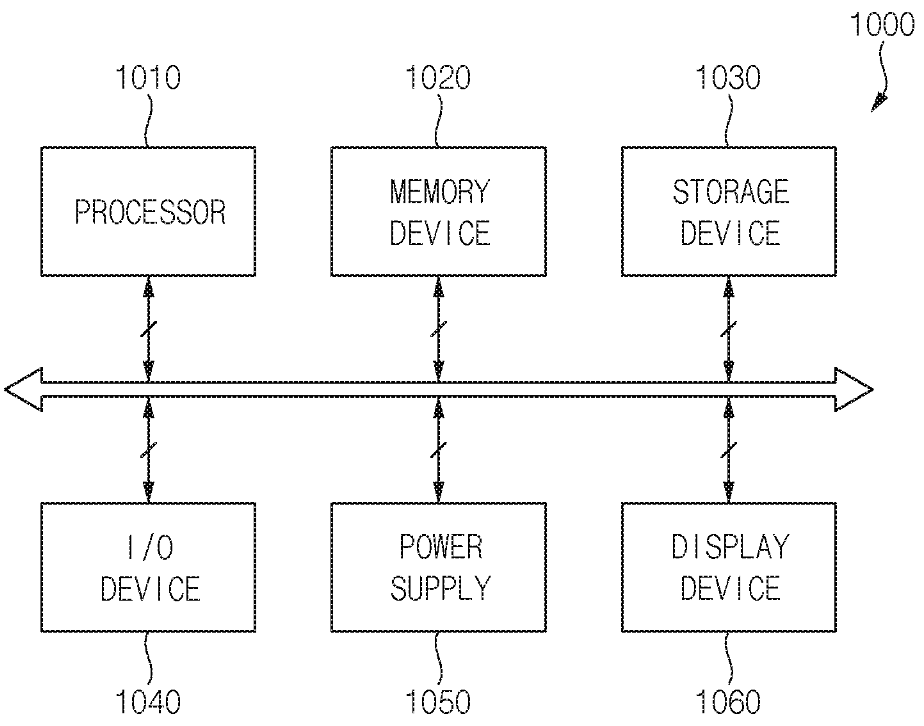
FIG. 9 is a block diagram showing an embodiment of an electronic device.
Figure 10:
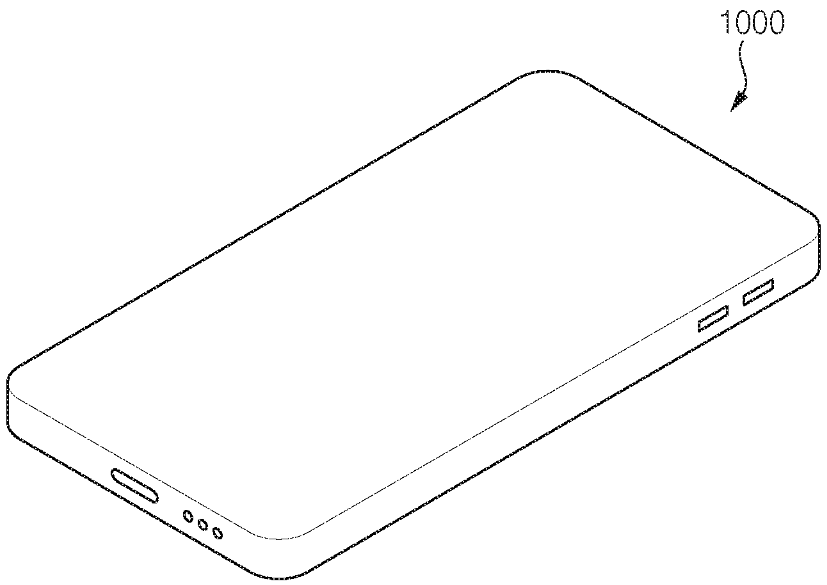
FIG. 10 is a diagram showing an embodiment in which an electronic device of FIG. 9 is implemented as a smart phone.

FIG. 9 is a block diagram showing an embodiment of an electronic device 1000. FIG. 10 is a diagram showing an embodiment in which an electronic device 1000 of FIG. 9 is implemented as a smart phone.

Referring to FIGS. 9 and 10, an embodiment of the electronic device 1000 may include a processor 1010, a memory device 1020, a storage device 1030, an input/output I/O device 1040, a power supply 1050, and a display device 1060. The display device 1060 may be the display device 100 of FIG. 1. In addition, the electronic device 1000 may further include a plurality of ports for communicating with a video card, a sound card, a memory card, a universal serial bus USB device, other electronic device, or the like.

In an embodiment, as illustrated in FIG. 10, the electronic device 1000 may be implemented as the smart phone. However, the electronic device 1000 is not limited thereto. In an embodiment, for example, the electronic device 1000 may be implemented as a cellular phone, a video phone, a smart pad, a smart watch, a tablet computer, a car navigation system, a computer monitor, a laptop, a head mounted display (TIMID) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection PCI bus.

The memory device 1020 may store data for operations of the electronic device 1000. In an embodiment, for example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile (DRAM) device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

Embodiments of the invention may be applied to any display device and any electronic device including the display device, for example, a mobile phone, a smart phone, a tablet computer, a digital television (TV), a three-dimensional (3D) TV, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate driver including a plurality of stages, wherein each of the stages comprises a control circuit and first to (M−1)-th gate output circuits, wherein each of the stages receives first to M-th clock signals, respectively, wherein M is a positive integer greater than or equal to 3, wherein the control circuit receives an input signal in response to one of the first to M-th clock signals, and controls a voltage of a control node and a voltage of an inverted control node based on the input signal, and the first to (M−1)-th gate output circuits sequentially outputs clock signals different from the one of the first to M-th clock signals received by the control circuit among the first to M-th clock signals as first to (M−1)-th gate signals in response to the voltage of the control node and the voltage of the inverted control node.

2. The gate driver of claim 1, wherein the one of the first to M-th clock signals is the M-th clock signal, and the control circuit includes:

a first transistor including a gate electrode which receives the M-th clock signal, a first electrode which receives the input signal, and a second electrode connected to the control node;

a second transistor including a gate electrode connected to the inverted control node, a first electrode which receives a high gate voltage, and a second electrode; and a third transistor including a gate electrode which receives a control clock signal, a first electrode connected to the control node, and a second electrode connected to the second electrode of the second transistor.

3. The gate driver of claim 2, wherein the control clock signal is one of the first to (M−1)-th clock signals.

4. The gate driver of claim 2, wherein the control circuit further includes:

a fourth transistor including a gate electrode connected to the control node, a first electrode which receives the M-th clock signal, and a second electrode connected to the inverted control node.

5. The gate driver of claim 4, wherein the control circuit further includes:

a fifth transistor including a gate electrode which receives the M-th clock signal, a first electrode which receives a low gate voltage, and a second electrode connected to the inverted control node.

6. The gate driver of claim 2, wherein the control circuit further includes:

a fourth transistor including a gate electrode which receives the input signal, a first electrode which receives the (M−1)-th gate signal, and a second electrode connected to the inverted control node.

7. The gate driver of claim 6, wherein the control circuit further includes:

a fifth transistor including a gate electrode which receives the (M−1)-th gate signal, a first electrode which receives a low gate voltage, and a second electrode connected to the inverted control node.

8. The gate driver of claim 2, wherein the first gate output circuit includes:

a sixth transistor including a gate electrode connected to the inverted control node, a first electrode which receives the high gate voltage, and a second electrode connected to a first gate output node from which the first gate signal is output;

a seventh transistor including a gate electrode connected to the control node, a first electrode which receives the first clock signal, and a second electrode connected to the first gate output node;

a first capacitor including a first electrode which receives the high gate voltage and a second electrode connected to the inverted control node; and a second capacitor including a first electrode connected to the control node and a second electrode connected to the first gate output node, and the second gate output circuit includes:

a ninth transistor including a gate electrode connected to the inverted control node, a first electrode which receives the high gate voltage, and a second electrode connected to a second gate output node from which the second gate signal is output;

a tenth transistor including a gate electrode connected to the control node, a first electrode which receives the second clock signal, and a second electrode connected to the second gate output node; and a fourth capacitor including a first electrode connected to the control node and a second electrode connected to the second gate output node.

9. The gate driver of claim 8, wherein the control node includes first to third control nodes, and the first gate output circuit further includes:

an eighth transistor including a gate electrode which receives a low gate voltage, a first electrode connected to the first control node, and a second electrode connected to the second control node.

10. The gate driver of claim 9, wherein the second gate output circuit further includes:

an eleventh transistor including a gate electrode which receives the low gate voltage, a first electrode connected to the first control node, and a second electrode connected to the third control node.

11. The gate driver of claim 1, wherein the one of the first to M-th clock signals is the M-th clock signal, and the control circuit includes:

a first transistor including a gate electrode which receives the M-th clock signal, a first electrode which receives the input signal, and a second electrode connected to the control node;

a second transistor including a gate electrode connected to the control node, a first electrode which receives a high gate voltage, and a second electrode connected to the inverted control node; and a third transistor including a gate electrode connected to the control node, a first electrode which receives a low gate voltage, and a second electrode connected to the inverted control node.

12. The gate driver of claim 11, wherein the first gate output circuit includes:

a fourth transistor including a gate electrode connected to the inverted control node, a first electrode which receives the high gate voltage, and a second electrode connected to a first gate output node from which a first gate signal is output;

a fifth transistor including a gate electrode connected to the control node, a first electrode which receives the first clock signal, and a second electrode connected to the first gate output node;

a first capacitor including a first electrode which receives the high gate voltage and a second electrode connected to the inverted control node; and a second capacitor including a first electrode connected to the control node and a second electrode connected to the first gate output node, and the second gate output circuit includes:

a seventh transistor including a gate electrode connected to the inverted control node, a first electrode which receives the high gate voltage, and a second electrode connected to a second gate output node from which a second gate signal is output;

an eighth transistor including a gate electrode connected to the control node, a first electrode which receives the second clock signal, and a second electrode connected to the second gate output node; and a fourth capacitor including a first electrode connected to the control node and a second electrode connected to the second gate output node.

13. The gate driver of claim 12, wherein the control node includes first to third control nodes, and the first gate output circuit further includes:

a sixth transistor including a gate electrode which receives the low gate voltage, a first electrode connected to the first control node, and a second electrode connected to the second control node.

14. The gate driver of claim 13, wherein the second gate output circuit further includes:

a ninth transistor including a gate electrode which receives the low gate voltage, a first electrode connected to the second control node, and a second electrode connected to the third control node.

15. A display device comprising:

a display panel including a plurality of pixels; and a gate driver which provides a gate signal to the pixels, wherein the gate driver includes a plurality of stages, wherein each of the stages includes a control circuit and first to (M−1)-th gate output circuits, wherein each of the stages receives first to M-th clock signals, respectively, wherein M is a positive integer greater than or equal to 3, wherein the control circuit receives an input signal in response to one of the first to M-th clock signals, and controls a voltage of a control node and a voltage of an inverted control node based on the input signal, and the first to (M−1)-th gate output circuits sequentially outputs clock signals different from the one of the first to M-th clock signals received by the control circuit among the first to M-th clock signals as first to (M−1)-th gate signals in response to the voltage of the control node and the voltage of the inverted control node.

16. The display device of claim 15, wherein the one of the first to M-th clock signals is the M-th clock signal, and the control circuit includes:

a first transistor including a gate electrode which receives the M-th clock signal, a first electrode which receives the input signal, and a second electrode connected to the control node;

a second transistor including a gate electrode connected to the inverted control node, a first electrode which receives a high gate voltage, and a second electrode; and a third transistor including a gate electrode which receives a control clock signal, a first electrode connected to the control node, and a second electrode connected to the second electrode of the second transistor.

17. The display device of claim 16, wherein the control clock signal is one of the first to (M−1)-th clock signals.

18. The display device of claim 16, wherein the control circuit further includes:

a fourth transistor including a gate electrode connected to the control node, a first electrode which receives the M-th clock signal, and a second electrode connected to the inverted control node.

19. The display device of claim 18, wherein the control circuit further includes:

a fifth transistor including a gate electrode which receives the M-th clock signal, a first electrode which receives a low gate voltage, and a second electrode connected to the inverted control node.

20. The display device of claim 16, wherein the control circuit further includes:

a fourth transistor including a gate electrode which receives the input signal, a first electrode which receives the (M−1)-th gate signal, and a second electrode connected to the inverted control node.

21. An electronic device comprising the display device of claim 15.

* * * * *